United States Patent
Panayotov

(10) Patent No.: US 9,896,140 B1
(45) Date of Patent: Feb. 20, 2018

(54) SUSPENSION FOR A BICYCLE SADDLE

(71) Applicant: Gabriel Valentinov Panayotov, Viby Sjælland (DK)

(72) Inventor: Gabriel Valentinov Panayotov, Viby Sjælland (DK)

(*) Notice: Subject to any disclaimer, the term of this patent is extended or adjusted under 35 U.S.C. 154(b) by 0 days.

(21) Appl. No.: 14/971,820

(22) Filed: Dec. 16, 2015

(51) Int. Cl.
  *B60N 2/38* (2006.01)
  *B62J 1/02* (2006.01)
  *B62J 1/08* (2006.01)
  B62J 1/00 (2006.01)
  B62J 1/10 (2006.01)

(52) U.S. Cl.
  CPC . *B62J 1/02* (2013.01); *B62J 1/08* (2013.01); *B62J 1/00* (2013.01); *B62J 1/10* (2013.01)

(58) Field of Classification Search
  CPC ......... B62J 1/02; B62J 1/08; B62J 1/00; B62J 1/10
  USPC .............. 297/195.1, 199, DIG. 10, 205, 214, 297/215.16, 195.11, 215, 209
  See application file for complete search history.

(56) References Cited

U.S. PATENT DOCUMENTS

| | | | |
|---|---|---|---|
| 502,017 A | 7/1893 | Richmond | |
| 533,921 A | 2/1895 | Richmond | |
| 3,758,154 A * | 9/1973 | Kitaguchi | B62J 1/08 297/203 |
| 4,541,668 A | 9/1985 | Rouw | |
| 5,242,184 A * | 9/1993 | Nicholls | B62J 1/00 280/220 |
| 5,765,912 A * | 6/1998 | Bontrager | B62J 1/22 297/201 |
| 5,823,618 A * | 10/1998 | Fox | B62J 1/005 297/195.1 |
| 6,213,553 B1 * | 4/2001 | Fitz | A47C 9/002 297/195.1 |
| 6,402,234 B1 * | 6/2002 | Yu | B62J 1/08 248/298.1 |
| 7,093,894 B2 | 8/2006 | Yu | |
| 7,431,390 B2 | 10/2008 | Martin | |
| 7,513,568 B2 * | 4/2009 | Hung | B62J 1/00 297/195.1 |
| 8,371,649 B2 * | 2/2013 | Segato | B62J 1/00 297/215.16 |
| 2004/0026967 A1 * | 2/2004 | Nelson | B62J 1/00 297/195.1 |

(Continued)

FOREIGN PATENT DOCUMENTS

WO 2007091983 A2 8/2007

*Primary Examiner* — Chi Q Nguyen
(74) *Attorney, Agent, or Firm* — Quickpatents, LLC; Kevin Prince

(57) ABSTRACT

A seat apparatus includes a rigid base adapted for selectively mounting on a seat post of a bicycle and includes an armature mount. A rigid armature has a rear end, a front end, and a central mounting portion adapted for fixing with the armature mount of the base. A saddle has a top side, a bottom side, a front end, and a rear end, the top side being adapted for receiving a person thereon in a seated position. A connecting element is fixed between the bottom side of the saddle and with the front end of the armature. A cushion is fixed between the bottom side of the saddle and the rear end of the armature and includes a top membrane, a bottom membrane, and at least one peripheral membrane all capturing a cushioning substance therebetween. The cushion maintains a minimum height when under compression.

15 Claims, 7 Drawing Sheets

(56) References Cited

U.S. PATENT DOCUMENTS

| | | | | |
|---|---|---|---|---|
| 2006/0119147 A1* | 6/2006 | Nelson | ............... | B62J 1/00 297/195.1 |
| 2006/0284458 A1* | 12/2006 | Lee | ............... | B62J 1/18 297/214 |
| 2007/0145795 A1* | 6/2007 | Wyner | ............... | B62J 1/26 297/199 |
| 2011/0210231 A1* | 9/2011 | D'Aluisio | ............... | B62J 1/02 248/629 |

* cited by examiner

SUSPENSION FOR A BICYCLE SADDLE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to bicycle saddles, and more particularly to a suspension device for a bicycle saddle.

DISCUSSION OF RELATED ART

Bicycle seats, or saddles, are traditionally mounted rigidly on a bicycle seat post. Little shock absorption is typically possible within the saddle itself, other than a thin layer of foam or other cushioning substance. As a result, discomfort and pain in the spine, pelvis area groin area is common for cyclists, particularly over uneven terrain or after long durations of riding. Over time, various pathological complications of the spine, pelvis area, groin area can occur. Further, proper blood circulation in the genital area, in both males and women, can be affected.

There are many prior art products that attempt to offer a solution of this problem. Some prior art products comprise bicycle saddles that allow a certain amount of movement of the pelvis while cycling, described as swinging, rocking or similar movements. Such prior art products are referred to as dynamic, active and/or ergonomic saddles. Nevertheless, none of the prior art devices provides a sufficient solution to the problem of fatigue in the pelvis area for cyclists riding for extended durations or over rough terrain.

Therefore, there is a need for a dynamic saddle device that provides a unique and comfortable movement of the pelvis and associated areas while cycling. Such a needed device is relatively easy to manufacture, install and maintain. The present invention accomplishes these objectives.

SUMMARY OF THE INVENTION

The present device is a seat apparatus for mounting on a seat post of a bicycle or similar vehicle. A rigid base is adapted for selectively mounting on the seat post of the bicycle and includes an armature mount. A rigid armature has a rear end, a front end, and a central mounting portion adapted for fixing with the armature mount of the base.

A saddle has a top side, a bottom side, a front end, and a rear end, the top side being adapted for receiving a person thereon in a seated position. The saddle may be a resilient or flexible material such as leather, foam, cushioned vinyl, or the like.

A connecting element is fixed between the bottom side of the saddle proximate the front end thereof and with the front end of the armature. The connecting element has a resilient member for providing a first resilient connection between the saddle and the armature. The connecting element preferably further includes a double-hourglass shaped elastomeric spacer. In such an embodiment, the front end of the armature is a U-shaped member partially curved around the elastomeric spacer. A mechanical fastener is longitudinally aligned with the elastomeric spacer. The curved front end of the armature fastens the elastomeric spacer to the front end of the saddle.

A pliable cushion is fixed between the bottom side of the saddle proximate the rear end thereof and the rear end of the armature. The cushion provides a second resilient connection between the saddle and the armature.

Preferably the rear end of the armature includes a rigid lower bed having an upwardly-facing recess. Similarly, the bottom side of the saddle proximate the ear end thereof includes an upper bed having a downwardly-facing recess. The cushion includes a top membrane, a bottom membrane, and at least one peripheral membrane all capturing a cushioning substance therein, such as foam, gel, elastomeric rubber, a non-compressible fluid material, or the like. As such, the cushion is fixed between the recesses, of the upper and lower beds, such that the rear end of the saddle is able to rotate up and down and shift laterally left and right about a pivoting front end thereof.

In one embodiment, the peripheral membrane includes an inner membrane adapted to contain the cushioning substance therein, and at least one retention cord is threaded between the top and bottom membranes, outside of the inner membrane. As such, the at least one retention cord prevents the inner membrane from exceeding a predetermined diameter and thereby maintaining a minimum height of the cushion when the cushion is under compression between the upper and lower beds. The at least one peripheral membrane may further including at least one outer membrane adapted to contain a lubricant, such as oil, between the top membrane, lower membrane, inner membrane, and the outer membranes.

The present invention is a dynamic saddle device that provides a unique and comfortable movement of the pelvis and associated areas while cycling. The present device is relatively easy to manufacture, install and maintain. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
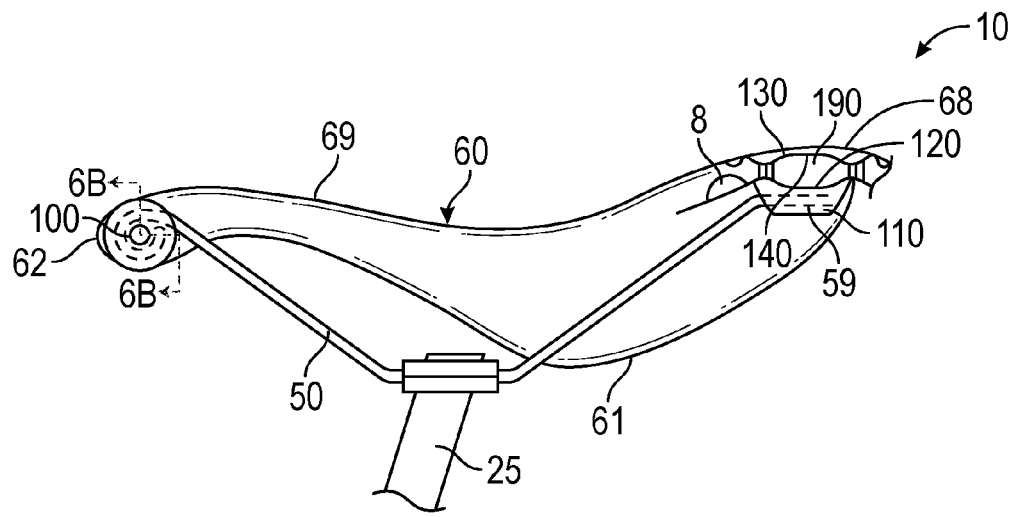
FIG. 1 is a right-side elevational view of the invention, partially cut-away to reveal a base and an armature thereof.
Figure 2:
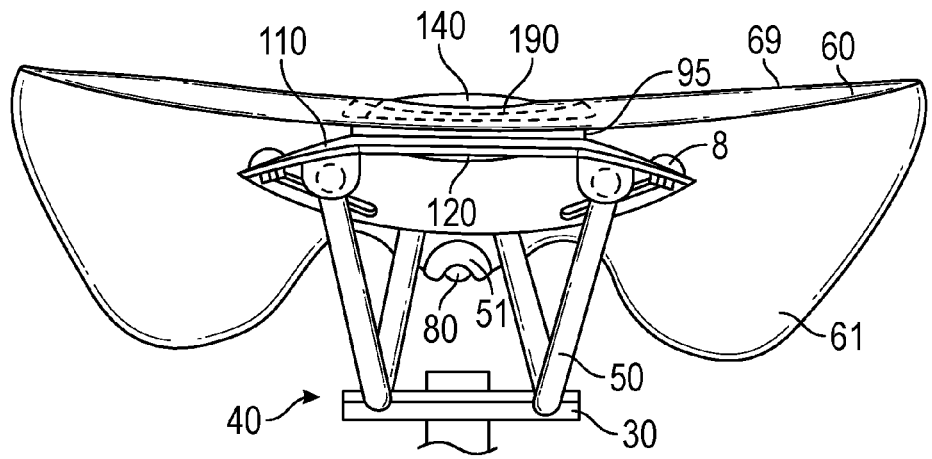
FIG. 2 is a rear elevational view of the invention.
Figure 3:
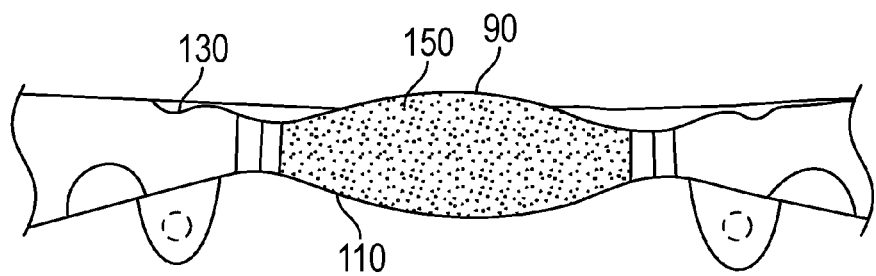
FIG. 3 is an enlarged, partial side elevational view of a cushion of the invention.

FIGS. 1-3 illustrate a seat apparatus 10 for mounting on a seat post 25 of a bicycle 20 or similar vehicle. A rigid base 30 is adapted for selectively mounting on the seat post 25 of the bicycle 20 and includes an armature mount 40.

Figure 4:
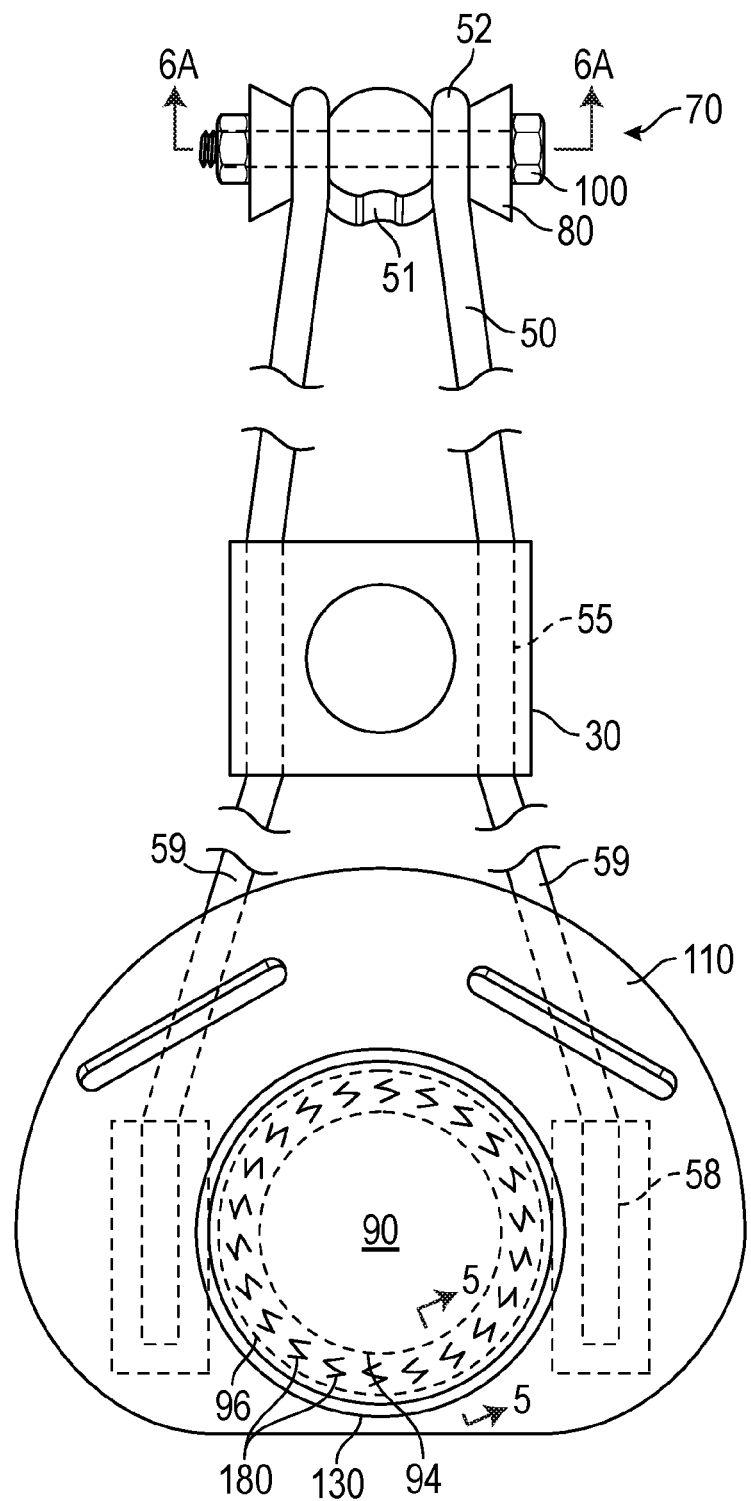
FIG. 4 is a bottom plan view of the invention, partially broken away.

A rigid armature 50 has a rear end 58, a front end 52, and a central mounting portion 55 adapted for fixing with the armature mount 40 of the base 30. Preferably the armature 50 includes a pair of rearwardly-projecting rigid arms 59 (FIG. 4), each terminating at the rear end 58 of the armature 50. The base 30 and armature 50 are preferably made from a strong metal material.

A saddle 60 has a top side 69, a bottom side 61, a front end 62, and a rear end 68, the top side 69 being adapted for receiving a person 18 thereon in a seated position. The saddle 60 may be a resilient or flexible material such as leather, foam, cushioned vinyl, or the like.

A connecting element 70 is fixed between the bottom side 61 of the saddle 60 proximate the front end 62 thereof and with the front end 52 of the armature 50. The connecting element 70 has a resilient member 80 for providing a first resilient connection between the saddle 60 and the armature 50. The connecting element 70 preferably further includes a double-hourglass shaped elastomeric spacer 75. In such an embodiment, the front end 52 of the armature 50 is a U-shaped member 51 (FIGS. 2, 4, 6A and 6B) partially curved around the elastomeric spacer 75. A mechanical fastener 100, such as a bolt or pin, is longitudinally aligned with the elastomeric spacer 75. The curved front end 52 of the armature 50 fastens the elastomeric spacer 75 to the front end 62 of the saddle 60.

A cushion 90 is fixed between the bottom side 61 of the saddle 60 proximate the rear end 68 thereof and the rear end 58 of the armature 50. The cushion 90 provides a second resilient connection between the saddle 60 and the armature 50.

Figure 8A:
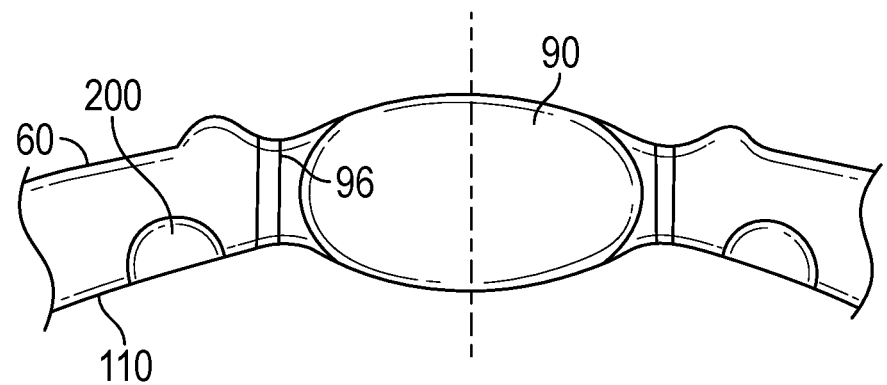
FIG. 8A is a rear elevational diagram of the cushion of the invention.
Figure 8B:
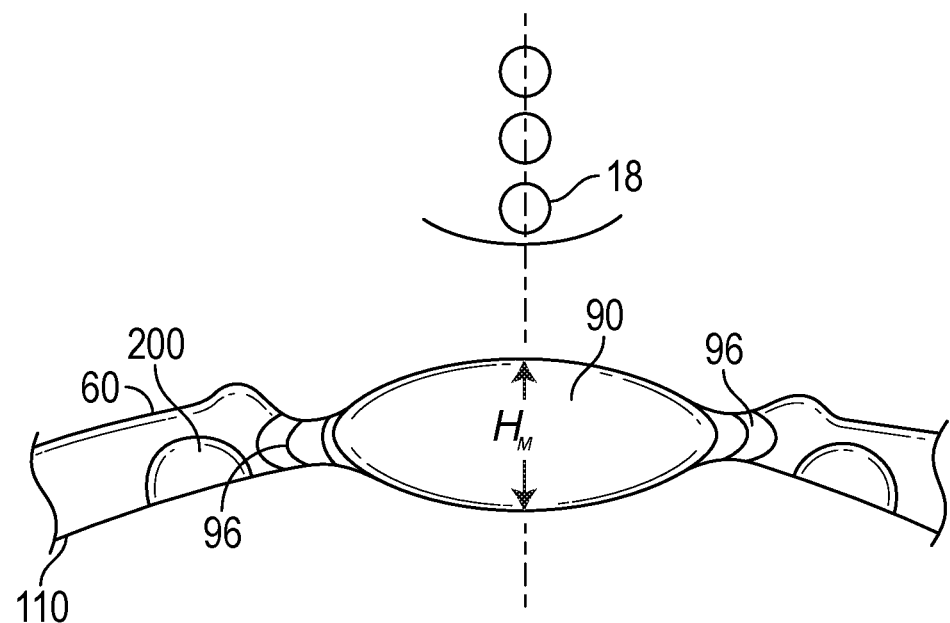
FIG. 8B is a rear elevational diagram of the cushion shown with the person vertically aligned therewith.
Figure 8C:
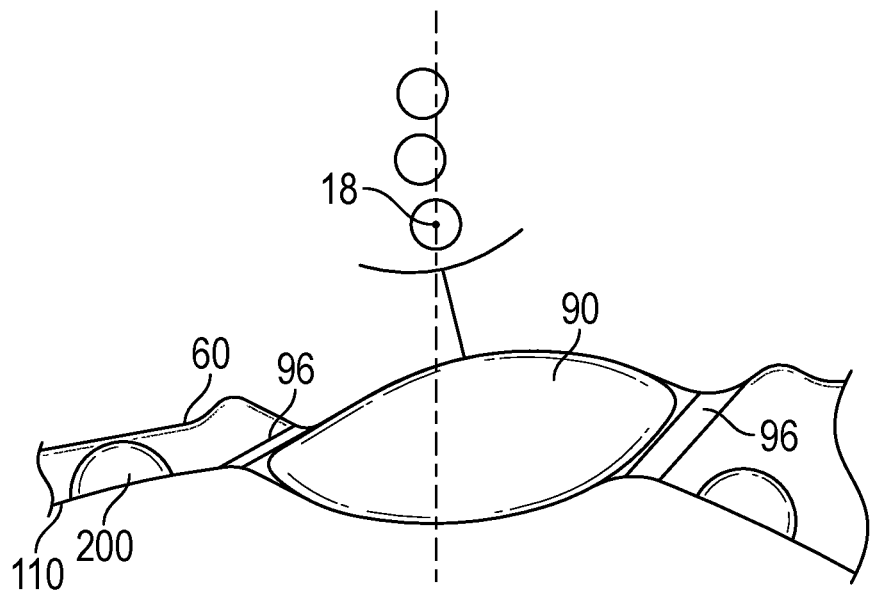
FIG. 8C is a rear elevational diagram of the cushion shown with the person shown vertically offset to the left, showing the deformation of the cushion thereby.
Figure 8D:
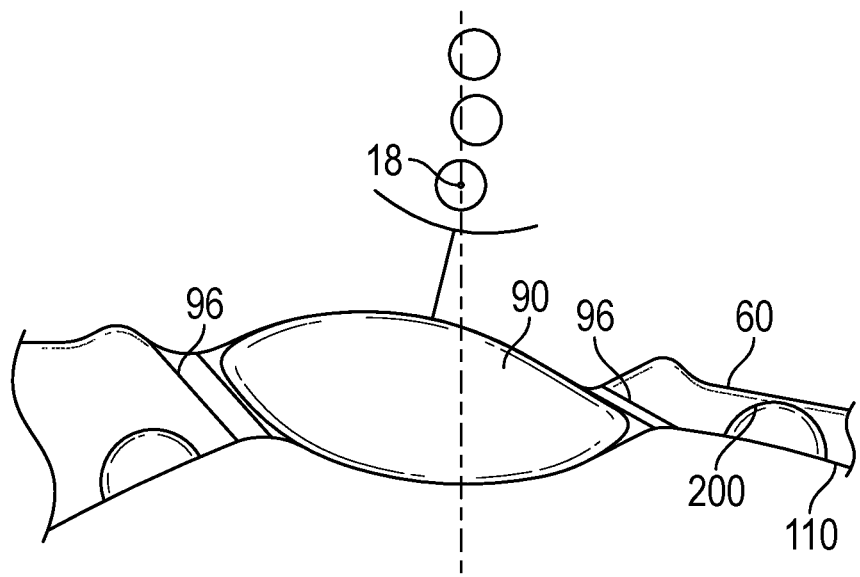
FIG. 8D is a rear elevational diagram of the cushion shown with the person shown vertically offset to the right, showing the deformation of the cushion thereby.

Preferably the rear end 58 of the armature 50 includes a rigid lower bed 110 having an upwardly-facing recess 120 (FIG. 2). Similarly, the bottom side 61 of the saddle 60 proximate the ear end 68 thereof includes an upper bed 130 having a downwardly-facing recess 140. The cushion 90 includes a top membrane 98, a bottom membrane 92, and at least one peripheral membrane 95 all capturing a cushioning substance 150 therein, such as foam, gel, elastomeric rubber, a non-compressible fluid material, or the like. As such, the cushion 90 is fixed between the recesses 120,140 of the upper and lower beds 130, 110 such that the rear end 68 of the saddle 60 is able to rotate up and down and shift laterally left and right (FIGS. 8C, 8D) about a pivoting front end 62 thereof. The cushion 90 may be fixed to each recess 120,140 with ultrasonic bonding, an adhesive 160, a mechanical faster 170, or the like. The upper bed 130 and top membrane 98 may be integrally formed, and the lower bed 110 and the bottom membrane 92 may be integrally formed.

Figure 5:
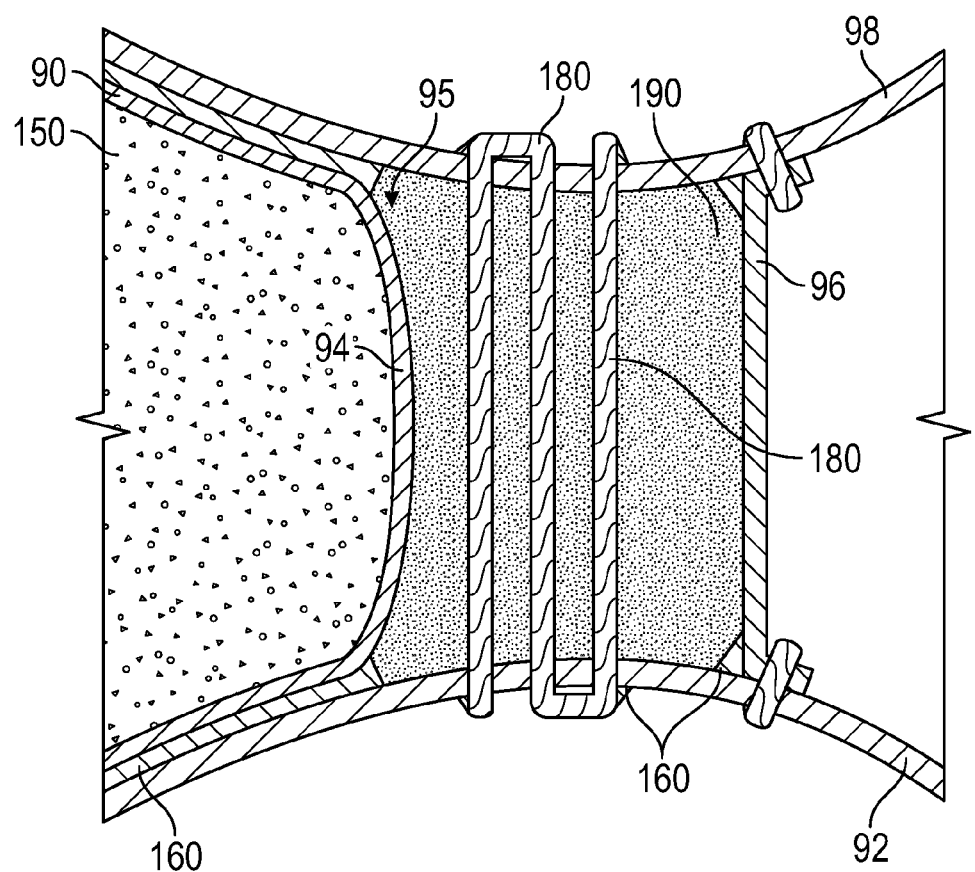
FIG. 5 is a cross-sectional view of the invention, taken along line 5-5 of FIG. 4.
Figure 6B:
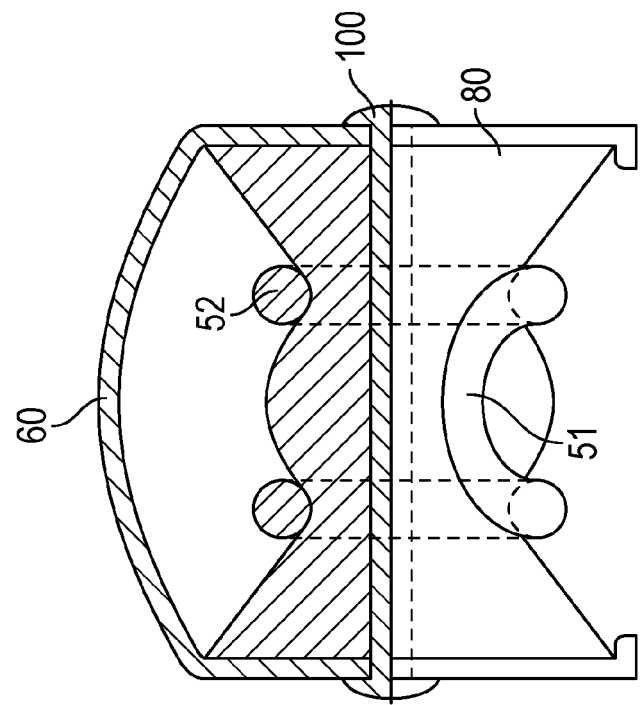
FIG. 6B is a cross-sectional view of the invention, taken along line 6B-6B of FIG. 1.
Figure 6A:
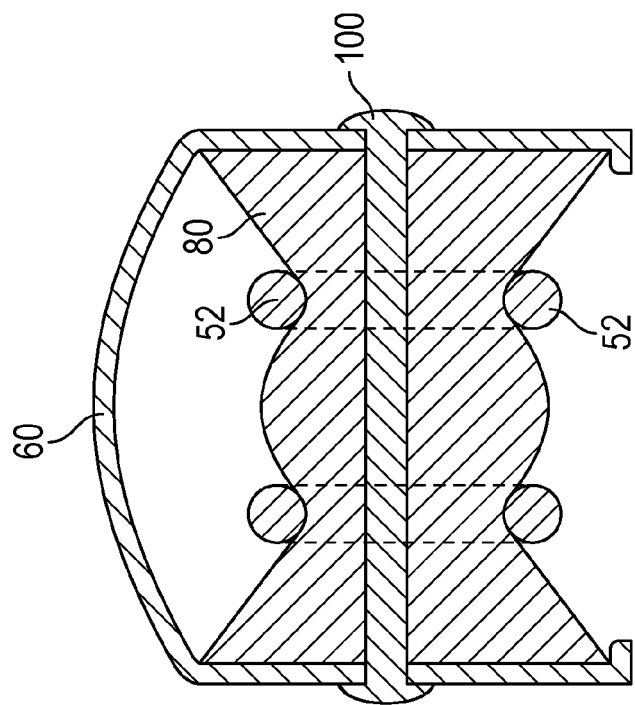
FIG. 6A is a cross-sectional view of the invention, taken along line 6A-6A of FIG. 4.
Figure 7:
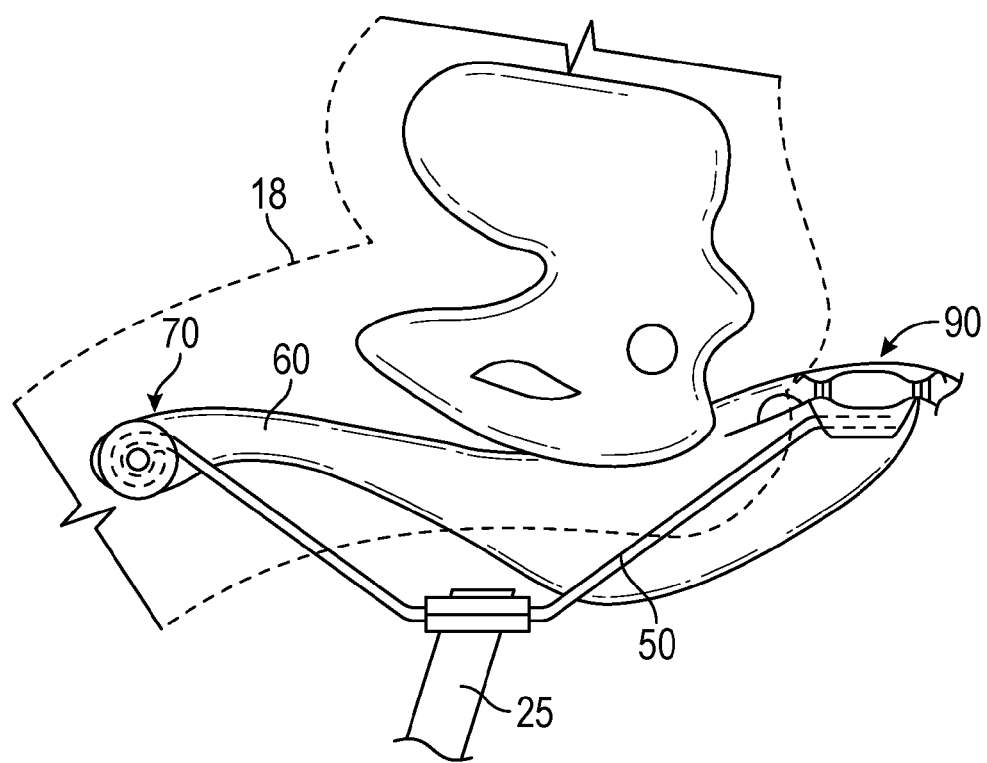
FIG. 7 is a side elevational diagram of the invention in-use with a person seated thereon.

In one embodiment, the peripheral membrane 95 includes an inner membrane 94 adapted to contain the cushioning substance 150 therein, and at least one retention cord 180 is threaded between the top and bottom membranes 98,92 outside of the inner membrane 94. As such, the at least one retention cord 180 prevents the inner membrane 94 from exceeding a predetermined diameter and thereby maintaining a minimum height $H_m$ of the cushion 90 when the cushion 90 is under compression (FIGS. 7-8D) between the upper and lower beds 130,110. The at least one peripheral membrane 95 may further including at least one outer membrane 96 adapted to contain a lubricant 190, such as oil, between the top membrane 98, lower membrane 92, inner membrane 94, and the outer membranes 96 (FIG. 5).

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference.

Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A seat apparatus for mounting on a seat post of a bicycle, comprising:
   a base adapted for selectively mounting on the seat post of the bicycle and including an armature mount;
   a rigid armature having a rear end, a front end, and a central mounting portion adapted for fixing with the armature mount of the base;
   a saddle having a top side, a bottom side, a front end, and a rear end, the top side adapted for receiving a person thereon in a seated position;
   a connecting element fixed between the bottom side of the saddle proximate the front end thereof and with the front end of the armature, the connecting element having a resilient member for providing a resilient connection between the saddle and the armature; and
   a cushion fixed between the bottom side of the saddle proximate the rear end thereof and the rear end of the armature, the cushion providing a resilient connection between the saddle and the armature;
   the connecting element further includes a double-hourglass shaped elastomeric spacer and wherein the front end of the armature is a U-shaped member partially curved around the elastomeric spacer, a mechanical fastener longitudinally aligned with the elastomeric spacer and the curved front end of the armature fastening the elastomeric spacer to the front end of the saddle.

2. The seat apparatus of claim 1 wherein the armature includes rearwardly-projecting rigid arms, each terminating at the rear ends thereof.

3. A seat apparatus for mounting on a seat post of a bicycle, comprising:
   a base adapted for selectively mounting on the seat post of the bicycle and including an armature mount;
   a rigid armature having a rear end, a front end, and a central mounting portion adapted for fixing with the armature mount of the base;
   a saddle having a top side, a bottom side, a front end, and a rear end, the top side adapted for receiving a person thereon in a seated position;
   a connecting element fixed between the bottom side of the saddle proximate the front end thereof and with the front end of the armature, the connecting element having a resilient member for providing a resilient connection between the saddle and the armature; and
   a cushion fixed between the bottom side of the saddle proximate the rear end thereof and the rear end of the armature, the cushion providing a resilient connection between the saddle and the armature;
   wherein the rear end of the armature includes a rigid lower bed having an upwardly-facing recess therein and wherein the bottom side of the saddle proximate the rear end thereof includes an upper bed having a downwardly-facing recess, and wherein the cushion includes a top membrane, a bottom membrane, and at least one peripheral membrane all capturing a cushioning substance therein, the cushion being fixed between the recesses of the upper and lower beds, whereby the rear end of the saddle is able to rotate up and down, and shift laterally left and right, about a pivoting the front end.

4. The seat apparatus of claim 3 wherein the cushion is fixed to the upper and/or lower beds with an ultrasonic bonding method.

5. The seat apparatus of claim 3 wherein the cushion is fixed to the upper and/or lower beds with an adhesive.

6. The seat apparatus of claim 3 wherein the cushion is fixed to the upper and/or lower beds with a mechanical fastener.

7. The seat apparatus of claim 3 wherein the at least one peripheral membrane includes an inner membrane adapted to contain the cushioning substance therein, and wherein at least one retention cord is threaded between the top and bottom membranes outside of the inner membrane, the at least one retention cord preventing the inner membrane from exceeding a predetermined diameter and thereby maintaining a minimum height of the cushion when the cushion is under compression between the upper and lower beds.

8. The seat apparatus of claim 3 wherein the at least one peripheral membrane includes an inner membrane adapted to contain the cushioning substance therein, and at least one outer membrane adapted to contain a lubricant between the top, bottom, inner, and outer membranes.

9. The seat apparatus of claim 8 wherein at least one retention cord is threaded between the top and bottom membranes, and fixed between the inner and outer membranes within the lubricant, the at least one retention cord preventing the inner membrane from exceeding a predetermined diameter and thereby maintaining a minimum height of the cushion when the cushion is under compression between the upper and lower beds.

10. The seat apparatus of claim 3 wherein the upper bed and top membrane are integrally formed.

11. The seat apparatus of claim 3 wherein the lower bed and the bottom membrane are integrally formed.

12. The seat apparatus of claim 3 wherein the cushioning substance is a gel material.

13. The seat apparatus of claim 3 wherein the cushioning substance is a foam material.

14. The seat apparatus of claim 3 wherein the cushioning substance is an elastomeric rubber material.

15. The seat apparatus of claim 3 wherein the cushioning substance is a non-compressible fluid material.

* * * * *